United States Patent Office 3,191,719
Patented June 29, 1965

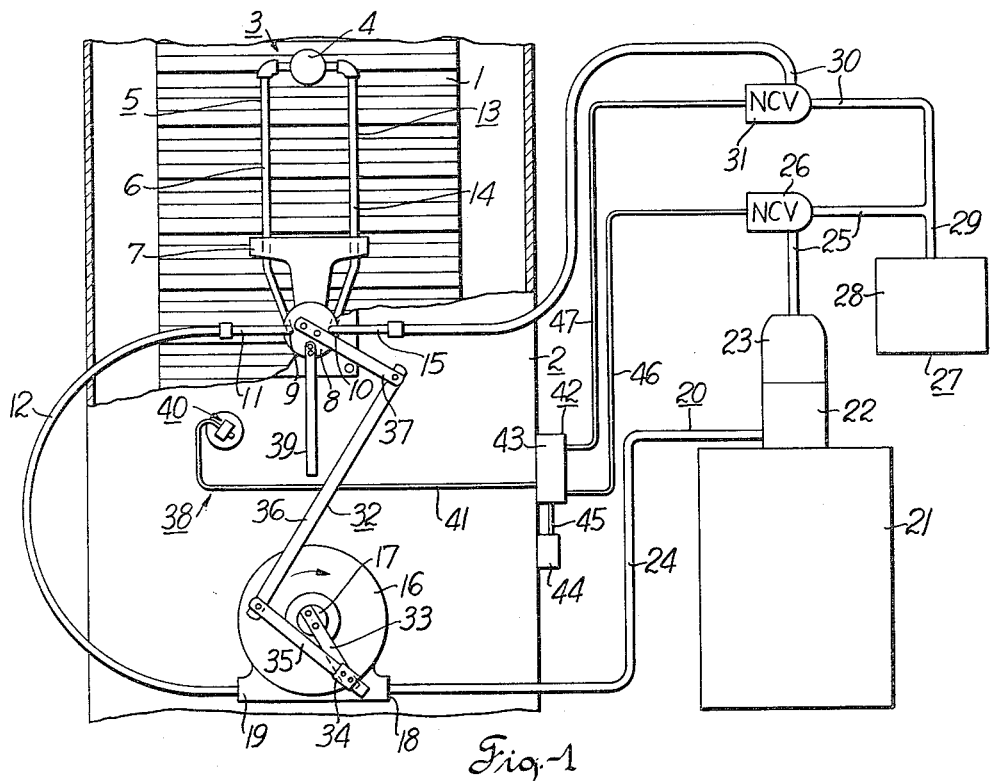

3,191,719
LUBRICATING SYSTEM
Eugene P. Waddell, Brookfield, and Raymond C. Jenness, Milwaukee, Wis., assignors to Allis-Chalmers Manufacturing Company, Milwaukee, Wis.
Filed Dec. 26, 1962, Ser. No. 247,217
4 Claims. (Cl. 184—6)

This invention relates to lubrication apparatus, particularly to those applying lubricant to ring gears used in driving large rotary mills, crushers, kilns, or similar structures.

The systems used for lubricating industrial gearing mechanisms of the ring gear type vary to some degree but it is generally considered necessary to use an automatic lubricant dispensing means. An automatic system insures proper lubrication and enables an adequate enclosure around the gear to be used to prevent contamination of the lubricant. In recent years the trend has been toward using a very viscous lubricant of a diluent type. The lubricant is dissolved so that it may be more easily pumped and passed through the nozzles onto the gear. The solvent rapidly evaporates on exposure to air leaving only the lubricant or compound.

In applying lubricant, it is essential that a sufficient amount of lubricant be applied at frequent intervals across the entire surface of the gear. Failure to apply lubricant to the total area of the gear increases friction as the gear comes in contact with the driving gear to such an extent that rapid destruction of the gear may result. Therefore, the problem of proper application of lubricant may not be simply a problem of preventing slightly increased wear but may be a problem of preventing destruction of the gears themselves. Another consideration in applying lubricant is the need to keep the lubricant free from foreign matter. This can be reasonably assured by enclosing the gear to the greatest degree possible and having lubricant placed upon the gear from within the enclosure.

Since the application of lubricant is essential (and according to prior art practices is usually automatically applied at intervals) it is necessary that an alarm system be utilized to indicate when lubricant is not being applied as anticipated. Proper lubrication of gear surfaces entails, essentially, application of lubricant to the entire surface with adequate certainty that an alarm will be given if such is not accomplished.

Since some of the ring gears in use today are very wide, it has heretofore generally been necessary to use two or more lubricant dispensing nozzles arranged in fixed locations with each spraying an increment of gear width. Utilizing two or more nozzles in such a manner introduces two problems: First, it is difficult to provide an alarm system that signals when only one nozzle has been plugged; and second, in order to provide uniform lubricant to each increment of gear width it is necessary to have the lubricant supply to the nozzles come from a single source with the result that it is relatively easy for any foreign matter present to plug up less than all of the nozzles and discharge all of the lubricant through the remaining open nozzles.

This invention eliminates the two aforementioned problems because a single nozzle is oscillated across the width of a gear. With only one nozzle available the entire energy of the pressure system is available to clear the nozzle of any foreign matter that may get into the system. And since the flow of the lubricant through the single nozzle is the only source of lubricant, a stoppage of the flow of lubricant can be utilized to sound an alarm. Therefore, it is less likely that the application of the lubricant (or any part of the total amount of the lubricant applied) will be stopped and adequately simple alarm systems may be utilized to indicate when stoppage does occur.

An object of this invention is to make an operable system for applying lubricant to a ring gear surface that utilizes only a single nozzle regardless of the width of the ring gear.

Another object is to apply lubricant in a simple manner that enables easy control and metering of the lubricant flow.

Another object is to provide a system of applying lubricant that may be accomplished within an enclosed housing so as to decrease the possibility of contamination of the lubricant.

Other objects and advantages of this invention will be apparent from the following detailed description.

FIG. 1 is a view, partly diagrammatic, of a totally enclosed installation of this invention for lubricating a large diameter ring gear, with a portion of the enclosure broken away to show the arrangement of parts; and FIG. 2 is a schematic drawing of a timing circuit that may be utilized in the operation of this invention.

Referring to FIG. 1, a surface to be lubricated such as the surface of a ring gear 1, driven by a drive gear (not shown), is enclosed within a ring gear housing 2. Located adjacent to the surface of ring gear 1 is a lubricant spraying means 3 consisting of a lubrication nozzle 4 and a lubricant transporting means 5. The lubricant transporting means consists of a lubricant feeder pipe 6, a support bracket 7, a connecting means such as connecting shaft 8, a lubricant connecting pipe 11, and a lubricant feed line 12. Also connected to lubrication nozzle 4 is an air transporting means 13 consisting of an air feeder pipe 14 and an air connecting pipe 15.

Connecting shaft 8 extends through ring gear housing 2 and is supported by the ring gear housing so as to be oscillated relative thereto.

An operating means such as a fluid motor 16 is also mounted on ring gear housing 2 and is spaced a distance from connecting shaft 8. Motor 16 consists essentially of a motor power shaft 17, a fluid inlet 18 and a fluid outlet 19. Line 12 is connected to fluid outlet 19. As will be explained more fully later, the motive fluid for motor 16 also serves as the lubricant for ring gear 1.

A lubricant supplying means 20 is provided to deliver lubricant under pressure to motor inlet 18. The supply means 20 include a lubricant reservoir 21, a pump 22 and a pipe 24 connecting pump 22 to motor inlet 18. Pump 22 may be of any suitable type, rotary or reciprocating, but driven by an air motor 23 for reasons that will be explained as the description proceeds. Air motor 23 may be of any suitable type and may be arranged within an enclosing casing along with pump 22.

Air supply means 27 are provided, consisting of a pressurized air source 28, and a conduit 29 delivering pressurized air to conduits 25 and 30. Conduit 30 in turn communicates with air transporting means 13 through air connecting pipe 15. Conduit 25 delivers pressurized air to air motor 23. An air control valve 31 is interposed within conduit 30 and an air control valve 26 is interposed within conduit 25 for reasons that will appear when the operation of the system is described.

The shaft 8 is oscillated by the rotation of shaft 17 of motor 16, which is transmitted through a power transfer linkage 32. Linkage 32 comprises four links which comprise an arm 33, a lever 35, an arm 36 and an arm 37. Arm 33 is connected to a lever 35 by an adjustable connector 34. For the particular width of gear 1, there will be an appropriate setting of connector 34 that will insure lubricant being sprayed across the entire width of gear 1. When connector 34 is placed in the position appropriate for gear 1, a pair of connections are made by such as screws, pins, etc. (indicated in FIG. 1 by a pair of circles on connector 34) passing through both arm 33 and lever 35. A pair of connections at two slightly separated locations fixes not only the length of both arm 33 and lever 35 but also rigidly connects them together to define a fixed angle. Without such a rigid fixed angle connection between arm 33 and lever 35, arm 36 would merely oscillate about its pivotal connection with arm 37 and would not oscillate the nozzle 4 in the intended manner. Lever 35 is connected to a transfer arm 36, which is connected to shaft arm 37. Shaft arm 37 is rigidly attached to connecting shaft 8.

A controlling means 38 controls the operation of air control valves 31, 26 and thereby controls the flow of air to line 14 and spray nozzle 4; and also controls the flow of air through conduit 25 to motor 23. The controlling means 38 consists of a switching arm 39 connected to oscillate with connecting shaft 8, a switch 40 mounted on ring gear housing 2 in a position to be struck by arm 39, a timing means 42 and a conduit 41 for enclosing wires connecting the trip switch and the timing means 42. Trip switch 40 is mounted on ring gear housing 2 and is of a type (described later) arranged to shift from one contact to another each time it is struck by switching arm 39. The timing means 42, as externally shown in FIG. 1, consists of a timer box 43, an audio alarm 44 and wire enclosing conduits 45, 46, 47.

In the operation of as much as has so far been described, ring gear 1 rotates about its axis as it is driven by a drive gear (not shown) and is lubricated by lubricant sprayed through lubrication nozzle 4 of lubricant spraying means 3. A lubricant often used is a diluent type gear shield compound having an asphaltic base. To assist in the atomization and proper distribution of the lubricant, air transporting means 13 provide pressurized air to the nozzle, and the lubricant and air are discharged through the nozzle with an appropriate direction and velocity to achieve proper lubricant distribution.

Lubricant reaches nozzle 4 via lubricant transporting means 5 which transports it from outlet 19 of fluid motor 16. The lubricant as it leaves motor 16 through outlet 19 travels through feeder line 12, connecting pipe 11, conduit 9 and through the connecting shaft 8 to lubricant feeder pipe 6. Support bracket 7 is shown connected to connecting shaft 8 within the enclosure and serves to rigidly carry the lubrication nozzle in a proper position.

Air reaches nozzle 4 via air transporting means 13 which delivers pressurized air from air supplying means 27, air line 29, line 30, connecting pipe 15, and conduit 10 through connecting shaft 8 to air feeder pipe 14. Connecting shaft 8 encloses both lubricant conduit 9 and air conduit 10 so that even as shaft 8 oscillates within its mounting upon ring gear housing 2, no opening is created in the enclosure such as might admit dust.

As the lubricant flows through fluid motor 16 it causes motor power shaft 17 to revolve and thereby, through linkage 32, oscillate connecting shaft 8. By suitable adjustment of linkage 32 the sweep of oscillation of lubrication nozzle 4 may be adjusted. Thus, it is seen that as long as lubricant is flowing through the fluid motor it will rotate and lubricant will be distributed uniformly across the entire width of gear 1.

In FIG. 1 the switching arm 39 of control means 38 oscillates with shaft 8 through an arc having a magnitude depending upon the setting of linkage 32. By locating the trip switch 40 upon ring gear housing 2 it is possible to have switching arm 39 trip the switch 40 when nozzle 4 reaches a desired limit position as determined by adjustment to linkage 32. Trip switch 40 is connected to the timing means 42 (described in the following paragraphs) which controls the starting and stopping of lubricant flow.

The mechanism within box 43 is shown schematically in FIG. 2 along with the external connections made with an electrical power source 48, trip switch 40, air control valve 31, and air control valve 26. Trip switch 40 is schematically represented as including a star wheel contact 40a turned in one direction only by the blows of arm 39 transmitted through a ratchet mechanism 40b. As contact 40a turns it shifts circuit completing contact alternately between contacts 40c and 40d. Within box 43 is a timer motor 49 connected to drive a cycle timer dial 49a. Cycle timers have been developed and are commerically available that are suitable for use according to this invention. One such cycle timer provides a rotating dial 49a with a plurality of pins 49b threaded into its periphery. The pins 49b can be turned to project from the dial far enough to engage with a star wheel 49c that drives a start wheel cycle switch 50. Rotary switch 50 engages one of a pair of contacts 50a and 50b. Each time a pin 49b turns star wheel 49c switch 50 shifts from one contact to the other contact of pair 50a, 50b. FIG. 2 shows three pins 49b spaced apart 120 degrees of arc. The cycle can of course be shortened by providing four pins spaced apart 90 degrees of arc; or the cycle can be lengthened by providing two pins 180 degrees apart.

Motor 49 is also drivingly connected to the power input side of a clutch 51. The power output side of clutch 51 is connected through a solenoid 52 to a signal timer dial 53 having provision for peripheral pins 53a, 53b. Dial 53 is biased to always return to a start point (established by a fixed stop bar 53c) when clutch 51 is disengaged, for reasons that will be explained later. The bias may be provided by a spring 54 connected to a cord 54a, with the cord being wound around the shaft of dial 53. When clutch 51 is engaged motor 49 will turn dial 53 counterclockwise until pin 53b engages a contact 53d which thereby completes a circuit for purposes that will be explained. When clutch 51 is disengaged spring 54 will pull cord 54a to turn dial 53 clockwise until pin 53a engages stop bar 53c.

A cutout relay 55, an alarm relay 56, a lubricant flow control relay 58 and an air flow control relay 59 are all shown in FIG. 2 as included in the circuitry. The manner in which each of these relays respond and the operations they perform will be discussed later when the operation of the system is described.

Before the described apparatus is operated with gear 1 turning, the length of time needed for one complete oscillating cycle of nozzle 4 should be determined (i.e., the time between successive actuations of switch 40 by arm 39). This need not be measured with stop watch accuracy. The time required will, of course, depend upon the operating rate of fluid pressure motor 16 and linkage 32 for a particular installation. For the purpose of explaining the operation of this invention, it will be assumed that the cycle takes about one minute and that the operator wishes to repeat the cycle every five minutes.

With the foregoing information in mind, the operator may then adjust the number and spacing of pins 49b on the cycle timer dial 49a to turn star wheel 49c, switch 50 and shift from one contact to the other of pair 50a and 50b. Next, the operator may adjust the position of pins 53a and 53b on the signal timer dial 53 to provide for a selected time delay before rotation of dial 53 makes contact between pin 53a and contact bar 53d. The length of time selected for such delay should be longer than cycle time (i.e., longer than one minute) but shorter than the time between cycles (i.e., less than five minutes). A delay time of three minutes may be considered appropriate.

With the foregoing adjustments having been made, the operation of the system is as follows. Power source 48 (FIG. 2) will energize the circuit to turn motor 49 and if a circuit is not completed through switches 40 and 50, such can be readily achieved by manually actuating ratchet mechanism 40b. The circuit completed through switches 40 and 50 performs the following three operations: (1) solenoid 52 is energized to engage clutch 51 and start turning signal delay timer dial 53; (2) relay 58 is energized to open valve 31 which provides atomizing air for nozzle 4 (FIG. 1); and (3) relay 59 (FIG. 2) is energized to open valve 26 and provide air to operate motor 23 (FIG. 1) which in turn operates pump 22 to supply lubricating fluid under pressure to motor 16 and nozzle 4.

The flow of lubricating oil to nozzle 4, as just described, will also turn motor 16 to operate linkage 32 to oscillate nozzle 4 first to the left (as shown in FIG. 1) and then to the right. When nozzle 4 completes its swing to the right, arm 39 will be swinging to the left toward switch 40. Referring again to FIG. 2, this action by arm 39 will push ratchet mechanism 40b and the star wheel contact 40a counterclockwise to shift engagement of contact 40a from contact 40c to contact 40d. The circuit across switch 40 will therefore be opened and then the three operations described in the preceding paragraph will be reversed. That is, (1) solenoid 52 will be deenergized causing the driven element of clutch 51 to fall out of engagement with the driving element, after which spring 54 will return signal delay timer dial 53 to its start position; (2) relay 58 is deenergized and value 31 closes; and (3) relay 59 is deenergized and valve 26 closes. The entire lubricant spraying means 3 then is stopped and remains inactive until timer dial 49a starts another lubricant applying cycle.

Another lubricant applying cycle begins after the time interval required for dial 49a to turn another of pins 49b into engagement with and turns star wheel 49c. When star wheel 49c is turned the cycle switch 50 also turns and shifts contact from 50b to 50a, thus once again completing a circuit through switches 40 and 50. The entire operation then is repeated and will be continued (for example once every five minutes) as long as source 48 energizes the motor 49 and relay 55 has not been activated to stop motor 49 (the operation of this relay 55 will be explained next).

It has been stated that pins 53a and 53b should be positioned on dial 53 to engage pin 53b and contact 53d after a period of time (e.g., 3 minutes) that is longer than cycle time (e.g., 1 minute) but shorter than the time between cycles (e.g., 5 minutes). Thus if the lubricant spraying means 3 stops before completing a spray cycle (because of a plugged nozzle, for example), then pin 53b will engage contact 53d completing a circuit that will perform two operations: (1) cutout relay 55 will be energized to open the circuit energizing motor 49 and cause it to stop turning; and (2) alarm relay 56 will energize an alarm 44 and deenergize circuits that are holding valves 26 and 31 in open position. Thus upon the failure of the spraying means 3 to oscillate and provide needed lubrication an alarm is sounded and the system is shut down.

The described system can be operated to provide two (or more) oscillations of spraying means 3, rather than but one, before each pause. Such can be achieved by merely providing ratchet mechanism 40b with a larger number of smaller teeth so that such larger number is the number of blows required by arm 39 on switch 40 in order to shift wheel contact 40a from one to the other of contacts 40c, 40d. Still other modifications can be expected to occur to those skilled in the art and be within the scope of this invention and therefore the invention is intended to be limited only by the scope of the claims appended hereto.

Having now particularly described and ascertained the nature of our said invention and the manner in which it is to be performed, we declare that what we claim is:

1. A lubrication system comprising: swivel support means; lubricant spray means connected to said support means; a fluid operated motor having a motive fluid inlet, fluid outlet and a drive shaft connected to said spray means; a crank linkage connected between said drive shaft and said spray means operative to oscillate said spray means about the swivel axis of said support means, said linkage including four links with the first two from the drive shaft being connected by a connector operative to secure said first two links together at two locations to establish a fixed angular relation therebetween; a source of pressurized fluid lubricant connected to said motor inlet to provide fluid to drive said motor; and conduit means connected between said motor outlet and said spray means to deliver the motive fluid lubricant discharged from said motor to said spray means.

2. A lubrication system comprising: swivel support means; lubricant spray means connected to said support means; a fluid operated motor having a motive fluid inlet, fluid outlet and a drive shaft connected to said spray means; a crank linkage connected between said drive shaft and said spray means operative to oscillate said spray means about the swivel axis of said support means; a source of pressurized fluid lubricant connected to said motor inlet to provide fluid to drive said motor; conduit means connected between said motor outlet and said spray means to deliver the motive fluid lubricant discharged from said motor to said spray means; a switch mounted in a fixed position to be struck a blow by a moving element of the system when the spray means reaches a limit position during its oscillation, and means responsive to a predetermined number of said blows to then operate to interrupt the flow of fluid from the source to the motor inlet and stop spraying action by the system.

3. In the system of claim 2, cycle repeat timing means responsive to a passing of a predetermined increment of cycle repeat time which is longer than operating time required from system start up to stopping action by said blow responsive means, after which said cycle timing means responds and operates to restore the flow of fluid from the source to the motor inlet to repeat spraying action by the system.

4. In the system of claim 3, an alarm device and signal means responsive to a passing of predetermined delay time which is longer than said operating time and shorter than said cycle repeat time, at which time said signal means responds and operates said alarm; and alarm signal deactivating means also responsive to the operation of said blow responsive switch, for deactivating said signal means and said alarm after the action by said blow responsive switch which indicates desired oscillation of the spraying means has occurred and no alarm is needed to indicate otherwise.

References Cited by the Examiner

UNITED STATES PATENTS

| | | | |
|---|---|---|---|
| 1,720,427 | 7/29 | Mulroy | 239—242 |
| 2,932,457 | 4/60 | Ballard | 239—242 |
| 3,006,439 | 10/61 | Molinaro | 184—6 |

LAVERNE D. GEIGER, *Primary Examiner.*

MILTON KAUFMAN, *Examiner.*